US008830387B2

(12) United States Patent
Chen

(10) Patent No.: US 8,830,387 B2
(45) Date of Patent: Sep. 9, 2014

(54) ELECTRONIC DEVICE HAVING IMAGE CAPTURING DEVICE CAPABLE OF ADJUSTING VIEW ANGLES

(71) Applicant: Hon Hai Precision Industry Co., Ltd., New Taipei (TW)

(72) Inventor: Shu-Ying Chen, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/756,985

(22) Filed: Feb. 1, 2013

(65) Prior Publication Data

US 2014/0063333 A1  Mar. 6, 2014

(30) Foreign Application Priority Data

Aug. 29, 2012  (TW) .................................. 101131392

(51) Int. Cl.
*H04N 5/225*  (2006.01)
(52) U.S. Cl.
CPC .................................. *H04N 5/2252* (2013.01)
USPC ........................................................ 348/373
(58) Field of Classification Search
None
See application file for complete search history.

(56) References Cited

U.S. PATENT DOCUMENTS

| 2003/0142973 | A1* | 7/2003 | Sawada .......................... 396/427 |
| 2004/0196403 | A1* | 10/2004 | Lee ................. 348/373 |
| 2004/0245342 | A1* | 12/2004 | Cho et al. ................. 235/472.01 |
| 2005/0049019 | A1* | 3/2005 | Lee ............. 455/575.4 |
| 2005/0110887 | A1* | 5/2005 | Shin et al. ................. 348/333.06 |
| 2005/0140812 | A1* | 6/2005 | Yoo et al. .................. 348/333.06 |
| 2005/0225668 | A1* | 10/2005 | Kim ................. 348/373 |
| 2005/0263600 | A1* | 12/2005 | Yang et al. ............... 235/472.01 |
| 2006/0197863 | A1* | 9/2006 | Kim ............................. 348/335 |
| 2010/0141830 | A1* | 6/2010 | Zhang .......................... 348/374 |
| 2010/0158511 | A1* | 6/2010 | Zhang .......................... 396/535 |
| 2012/0013584 | A1* | 1/2012 | Senatori ....................... 345/207 |

* cited by examiner

*Primary Examiner* — Justin P Misleh
(74) *Attorney, Agent, or Firm* — Novak Druce Connolly Bove + Quigg LLP

(57) ABSTRACT

An electronic device includes a shell, an image capturing device, a sliding key, a driving element, and a sliding pin. The shell defines a receiving space, a number of positioning grooves, and a through hole communicating with the receiving space. The image capturing device is received in the receiving space. The image capturing device includes a supporting frame rotatably connected with the shell and defining a matching hole. The sliding key includes an operation portion and a connection portion. The connection portion is received and slidable in the through hole. The driving element includes a main portion connected with the connection portion, at least one driving arm, and a tail portion. The tail portion includes a positioning protrusion received in one positioning groove. The sliding pin engages with the at least one driving arm and is slidable in the matching hole for driving the supporting frame to rotate.

10 Claims, 5 Drawing Sheets

ELECTRONIC DEVICE HAVING IMAGE CAPTURING DEVICE CAPABLE OF ADJUSTING VIEW ANGLES

BACKGROUND

1. Technical Field

The present disclosure relates to electronic devices and, particularly, to an electronic device having an image capturing device capable of adjusting view angles.

2. Description of Related Art

Electronic devices such as video telephones are equipped with an image capturing device for imaging functions. However, the image capturing device is usually fixedly mounted on a shell of the video telephone and the shell is fixedly mounted on a wall. View angles can not be adjusted for a user except when the user moves the video telephone, which is inconvenient.

Therefore, it is desirable to provide an electronic device having an image capturing device, which can overcome the limitations described.

DETAILED DESCRIPTION

Embodiments of the disclosure will be described with reference to the drawings.

Figure 1:
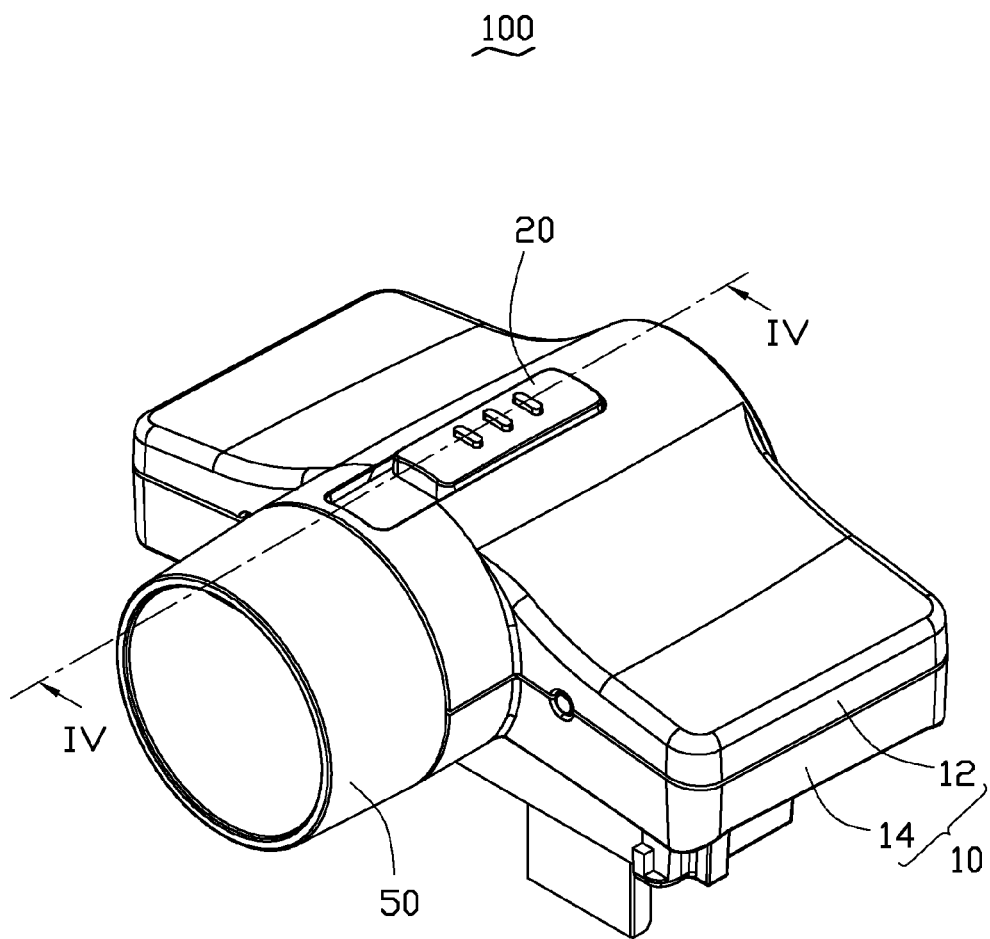
FIG. 1 is an assembled, isometric view of an electronic device having an image capturing device, in accordance with an exemplary embodiment.
Figure 2:
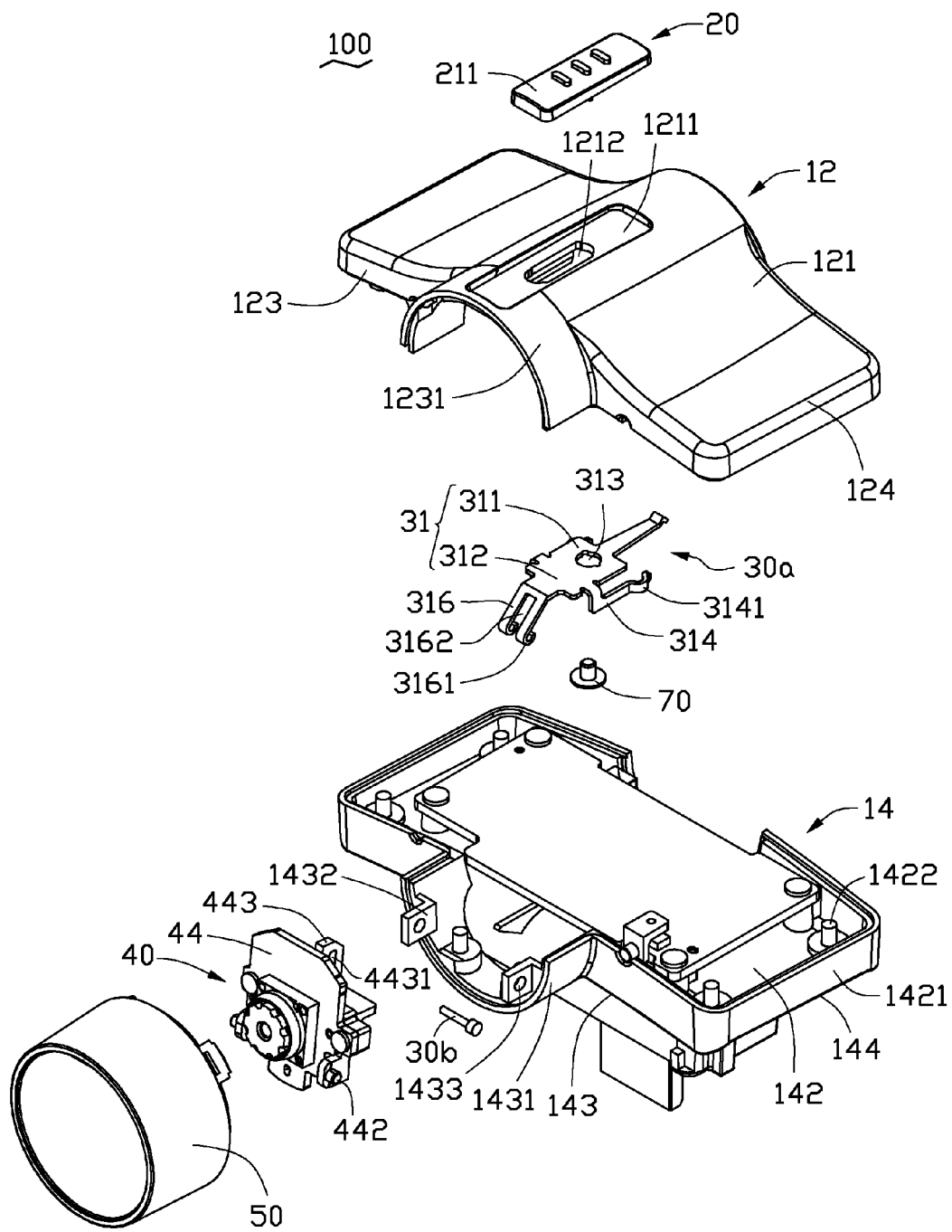
FIG. 2 is an exploded, isometric view of the electronic device having the image capturing device.
Figure 3:
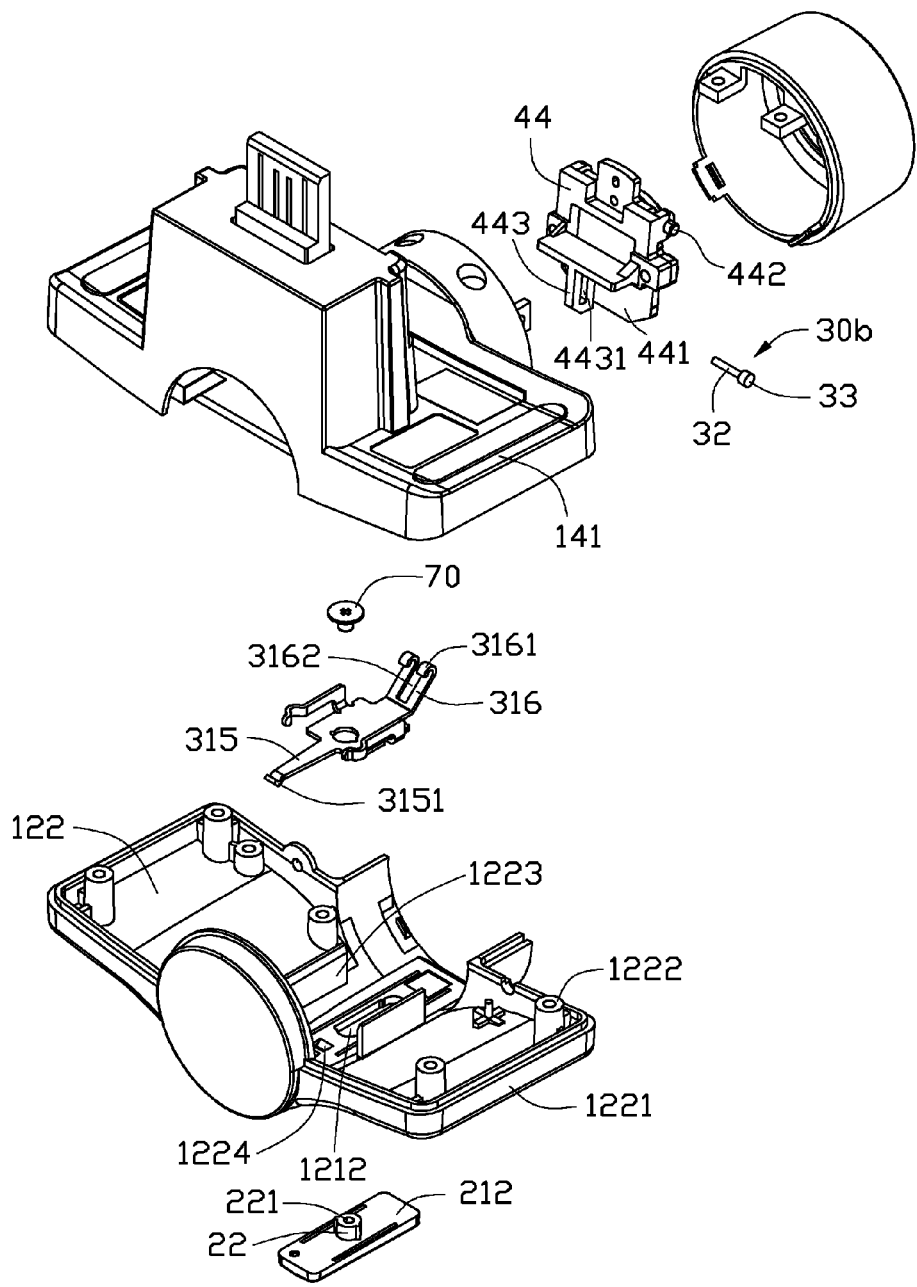
FIG. 3 is similar to FIG. 2, but viewed from another angle.

FIGS. 1 to 3 show an electronic device 100 in accordance with an exemplary embodiment. The electronic device 100 can be an all-in-one computer, a surveillance device, or a video telephone. In the embodiment, the electronic device 100 is a video telephone. The electronic device 100 includes a shell 10, a sliding key 20, a driving element 30a, a sliding pin 30b, an imaging capturing device 40, and a cover 50.

The shell 10 includes a first part 12 (i.e., an upper part as shown in FIGS. 1-2) and a second part 14 (i.e., a lower part as shown in FIGS. 1-2). The first part 12 is substantially rectangular and includes a first outer surface 121, a first inner surface 122 opposite to the first outer surface 121, a pair of parallel first long sides 123, and a pair of parallel first short sides 124 perpendicularly connecting the first long sides 123. The first part 12 defines a substantially rectangular sliding groove 1211 in the first outer surface 121 and a substantially rectangular through hole 1212 in a bottom surface of the sliding groove 1211 and through the first inner surface 122. The sliding groove 1211 is positioned in a center of the first outer surface 121. Long sides of the sliding groove 1211 are parallel to the first short sides 124. The through hole 1212 is positioned in a center of the sliding hole 1211. Long sides of the through hole 1212 are parallel to the long sides of the sliding groove 1211.

The first part 12 also includes an upper sidewall 1221, four assembling portions 1222, a pair of parallel rail plates 1223. The upper sidewall 1221 is discontinuous and extends up from the first long sides 123 and the first short sides 124 of the first inner surface 122. The upper sidewall 1221 defines an opening (not labeled) in a middle of one of the first long sides 123. An arched upper lug 1231 perpendicularly extends from the upper sidewall 1221 around the opening of the upper sidewall 1221. The four assembling portions 1222 are distributed at four corners of the first inner surface 122, respectively. Each assembling portion 1222 is a hollow cylinder.

The rail plates 1223 extend from the first inner surface 122 adjacent to the upper lug 1231 and symmetrically distributed at two sides of the through holes 1212. The rail plates 1223 are parallel to the long sides of the through hole 1212. A length of each first rail plate 1223 along a direction parallel to the long sides of the through hole 1212 is greater than a length of each long side of the through hole 1212.

The first inner surface 122 defines a number of positioning grooves 1224. The positioning grooves 1224 are arranged in a line and substantially aligned with the through hole 1212 (see FIGS. 4 and 5). The positioned grooves 1224 are adjacent to one end of the through hole 1212 facing away the upper lug 1231, namely the through hole 1212 is positioned between the upper lug 1231 and the positioning grooves 1224.

The second part 14 is substantially rectangular and includes a second outer surface 141, a second inner surface 142 opposite to the second outer surface 141, a pair of parallel second long sides 143, and a pair of parallel second short side 144 perpendicularly connecting the second long sides 143. The second part 14 also includes a lower sidewall 1421 and four engaging portions 1422. The lower sidewall 1421 is discontinuous and extends up from the second long sides 143 and the second short sides 144. The lower sidewall 1421 defines an opening (not labeled) in a middle of one of the second long sides 143. An arched lower lug 1431 perpendicularly extends from the lower sidewall 1421 around the opening of the lower sidewall 1421. A shape of the lower lug 1431 corresponds to a shape of the upper lug 1231. A pair of ear portions 1432 extend inwardly from a periphery of the lower lug 1431. Each ear portion 1432 defines a shaft hole 1433. The four engaging portions 1422 are distributed at four corners of the second inner surface 142. Each engaging portion 1422 is a cylinder and used to be clamped in a corresponding assembling portion 1222.

The sliding key 20 includes a rectangular plate-liked operation portion 21 and a connection portion 22. The operation portion 21 includes a top surface 211 and a bottom surface 212 opposite to the top surface 211. A length of each long side of the operation portion 21 is less than a length of each long side of the sliding groove 1211. A width and a thickness of the operation portion 21 correspond to a width and a depth of the sliding groove 1211, respectively. The connection portion 22 is substantially cylindrical and perpendicularly extends from the middle of the bottom surface 212. A diameter of the connection portion 22 is less than or corresponds to a width of the through hole 1212. The connection portion 22 defines a screw hole 221 in an end surface facing away the bottom surface 221.

The driving element 30a includes a plate-liked main portion 31. The main portion 31 includes a first end 311 and a second end 312 opposite to the first end 311. The main portion 31 defines a passing hole 313 adjacent to the first end 311. A pair of elastic arms 314 extends from two sides of the main portion 31. Each elastic arm 314 includes an arched distal end 3141 convex away from the other elastic arm 314. A distance between two arched distal ends 3141 of the pair elastic arms 314 is slightly greater than the distance between the rail plates 1223.

The driving element 30a also includes a tail portion 315 extending from the first end 311 and a pair of driving arms 316 extending from the second 312. The tail portion 315 is substantially coplanar with the main portion 31 and includes a positioning protrusion 3151 protruding from a distal end of the tail portion 315. The positioning protrusion 3151 corresponds to each positioning groove 1224. The driving arms 316 form an obtuse angle with the main portion 31. A distal end of each driving arm 316 is bent to form a hollow cylindrical hook portion 3161. The driving arms 316 define a slot 3162 therebetween.

The sliding pin 30b includes a cylindrical sliding portion 32 and a cylindrical head portion 33 coaxially connected to one end of the sliding portion 32. A diameter of the head portion 33 is greater than a diameter of the sliding portion 32.

Figure 4:
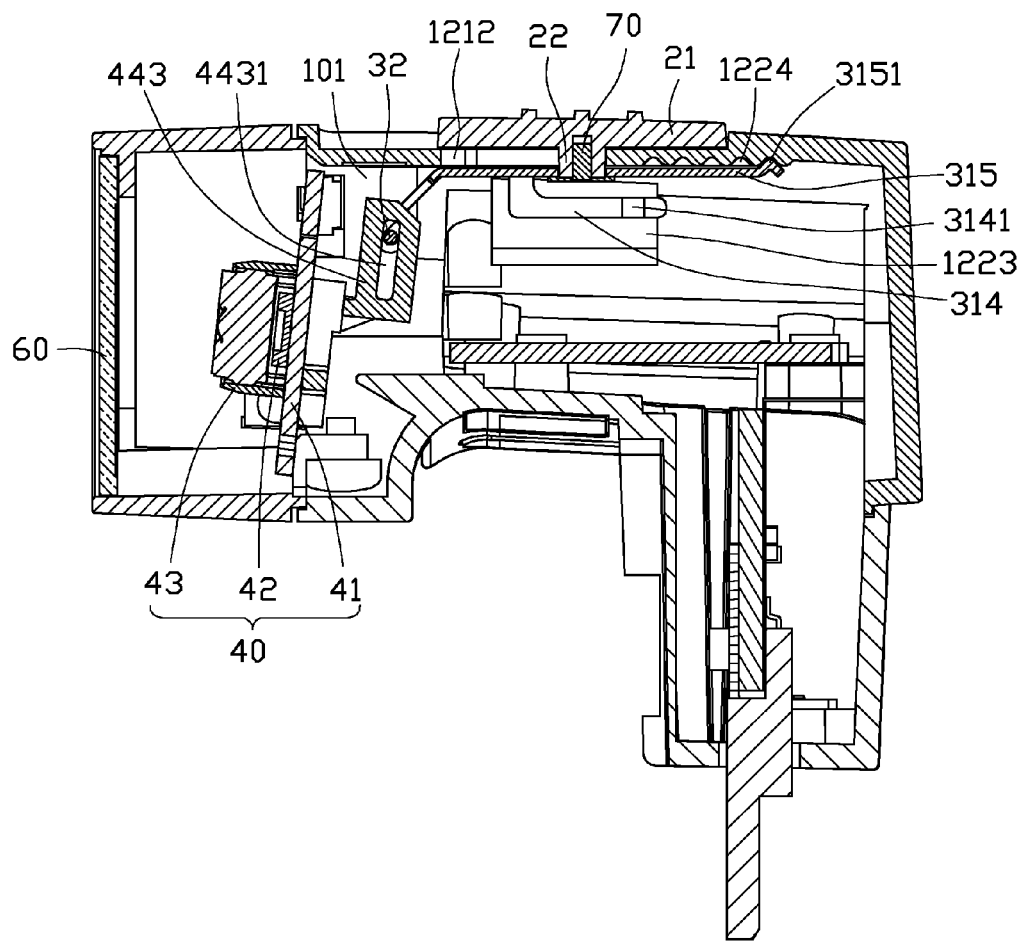
FIG. 4 is a cross-sectional view taken along a line IV-IV of FIG. 1, the image capturing device in a first stage.

Also referring to FIGS. 3 and 4, the image capturing device 40 includes a circuit board 41, an image sensor 42 mounted on the circuit board 41, a lens module 43 mounted on the circuit board 41, and a supporting frame 44. The supporting frame 44 includes a mounting plate 441, a pair of rotation shafts 442, and a matching block 443. The circuit board 41 is fixed on the mounted plate 441. The rotation shafts 442 are cylindrical and coaxially extend from two sides of the mounted plate 441. Each rotation shaft 442 corresponds to a shaft hole 1433. The matching block 443 extends from a surface of the mounting plate 441 opposite to the circuit board 41. The matching block 443 defines a substantially rectangular matching hole 4431 passing therethrough. A width of the matching hole 4431 corresponds to a diameter of the sliding portion 32.

The cover 50 is a hollow cylinder and an inner diameter of the cover 50 corresponds to outer diameters of the upper lug 1231 and the lower lug 1431. The cover 50 receives a circular glass plate 60 at one end. The glass plate 60 can be an infrared filter or a transparent glass plate. In the embodiment, the glass plate 60 is a transparent glass plate.

When assembling, the operation portion 21 is received in the sliding groove 1211, the connection portion 22 is passed through the through hole 1212. The operation portion 21 is slidable in the sliding groove 1211 so accordingly, the connection portion 22 is slidable in the through hole 1212. The main portion 31 and the elastic arms 315 are limited between the rail plates 1223. Each arched distal end 3141 presses on a respective rail plate 1223, so as to the pair of arched distal ends 3141 are compressed between the pair of rail plates 1223. One surface of the main portion 31 contacts the first inner surface 122. The positioning protrusion 3151 is received in one of the positioning grooves 1224. Then the connection portion 22 is passed through the passing hole 313 from one surface of the main portion 31. A screw 70 is passed into the passing hole 313 from the other surface of the main portion 31 facing away the first inner surface 122 and engaged with the screw hole 221, such that the sliding key 20 is connected with the driving element 30a.

Each rotation shaft 442 is received in a respective shaft hole 1433 such that the image capturing device 40 is rotatably connected to the second part 14. The matching portion 433 is partially received in the slot 3162 with the hook portions 3161 being aligned with the matching hole 4431. The sliding portion 32 is sequentially passed through one of the hook portions 3161, the matching hole 4431, and the other hook portion 3161. The head portion 33 attaches on one of the hook portions 3161. Therefore, the sliding pin 30b is partially received in the matching hole 4431 and engaged with the driving element 30a and is slidable in the matching hole 4431. The long sides of the matching hole 4431 are perpendicular to a center axis of the rotation shafts 442. Each assembling portion 1222 is sleeved over a respective engaging portion 1422. The upper sidewall 1221 and the lower sidewall 1421 are attached to each other. Therefore, the first part 12 and the second part 14 are assembled together and cooperatively form a receiving space 101. The driving element 30a, the sliding pin 30b, and the image capturing device 40 are all received in the receiving space 101. The through hole 1212 communicates with the receiving space 101 and the connection portion 22 extends into the receiving space 101. The operation portion 21 is outside the receiving space 101. The upper lug 1231 and the lower lug 1431 cooperatively form a hollow cylinder. Then the cover 50 sleeves over the upper lug 1231 and the lower lug 1431.

Figure 5:
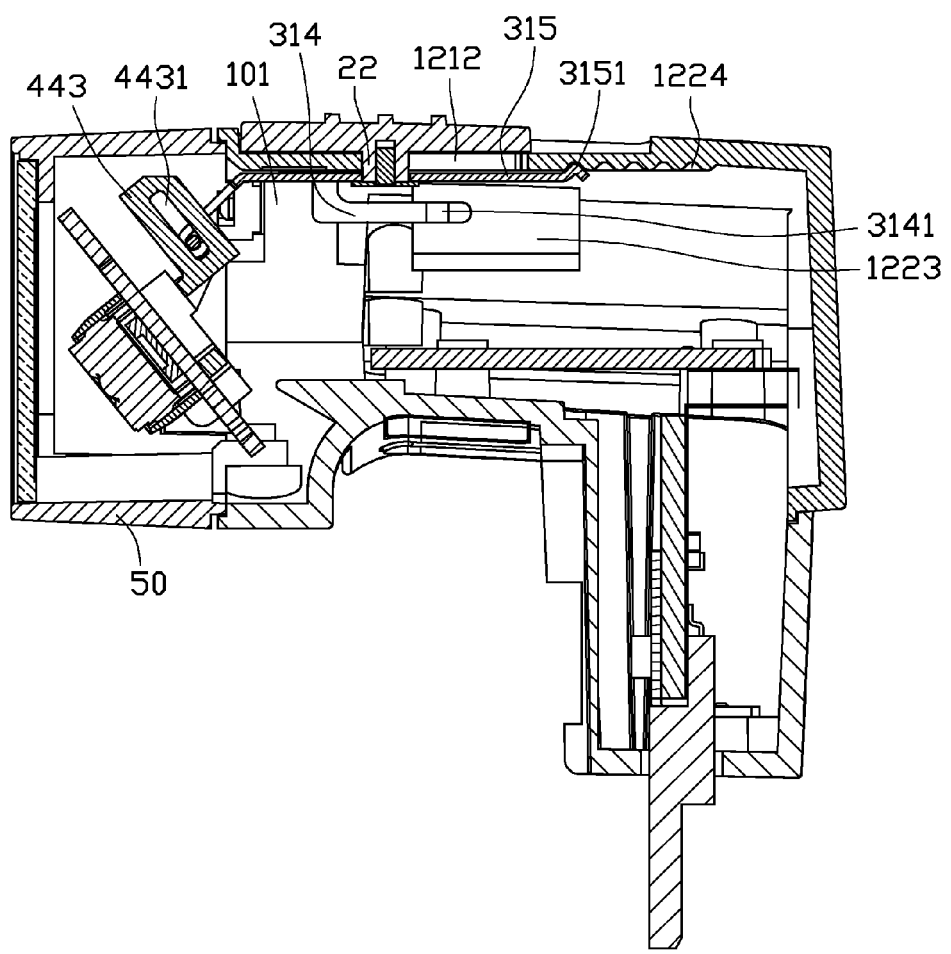
FIG. 5 is a cross-sectional view taken along a line IV-IV of FIG. 1, the image capturing device in a second stage.

FIGS. 4 and 5 show that in use, when a user slides the sliding key 20 from one end to the other end in the sliding hole 1212, the connection portion 22 is moved from one end to the other end in the through hole 1212. In addition, the sliding key 20 pulls the driving element 30a to move along a direction perpendicular to the center axis of the rotation shafts 442. The sliding portion 32 slides from one end to the other end in the matching hole 4431 to push or pull the matching block 443. Therefore, the supporting frame 44 is rotated clockwise or counterclockwise about the shaft portions 442, and the image capturing device 40 is rotated clockwise or counterclockwise about the shaft portions 442 relative to the second part 14, accordingly. Therefore, view angles of the image capturing device 40 can be adjusted.

When the positioning protrusion 3151 is received in a corresponding positioning groove 1224, the image capturing device 40 is maintained at a designed view angle. The elastic arms 314 are slid between the rail plates 1223. Therefore, it makes that the sliding key 20 be moved straight. In the embodiment, the friction forces between the elastic arms 314 and the rail plates 1223 can be reduced because the each rail plate 1223 contacts with a corresponding arched distal end 3141.

In alternative embodiments, the elastic arms 314 does not include the arched distal ends 3141, and each elastic arm 314 presses on a corresponding rail plate 1223.

In alternative embodiments, the first part 12 does not include the rail plates 1223.

In alternative embodiments, the driving element 30a includes only one driving arm 316.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An electronic device, comprising:
    a shell defining a receiving space, a number of positioning grooves, and a through hole communicating with the receiving space;
    an image capturing device received in the receiving space, the image capturing device comprising a supporting frame, the supporting frame having a pair of rotation shafts and a matching block, the rotation shafts being rotatably connected to the shell, the matching block defining a substantially rectangular matching hole, long sides of the matching hole being perpendicular to a center axis of the rotation shafts;
    a sliding key comprising an operation portion and a connection portion, the operation portion positioned outside of the receiving space, the connection portion extending from the operation portion into the receiving space, the connection portion being received and slidable in the through hole; and a driving element comprising a main portion, a tail portion extending from a first end of the main portion, and at least one driving arm extending from a second end of the main portion, the main portion being connected with the connection portion, the tail portion comprising a positioning protrusion for being received in one of the positioning grooves; and a sliding pin engage with the at least one driving arm, the sliding pin comprising a sliding portion received and slidable in the matching hole for driving the supporting frame to rotate about the rotation shafts.

2. The electronic device of claim 1, wherein the main portion is plate-liked, the at least one driving arm comprises two driving arms, the driving arms form an obtuse angle with the main portion and define a slot, the slot is defined between the driving arms, and the matching portion is partially received in the slot.

3. The electronic device of claim 2, wherein each driving arm comprises a hollow cylindrical hook portion, the sliding portion is passed through the matching hole and the hook portion of each driving arm, the driving pin comprises a head portion connected to the sliding portion, and the sliding portion is attached on one of the hook portions.

4. The electronic device of claim 2, wherein the shell comprises a first part, the first part comprises a first outer surface and a first inner surface, the first part defines a sliding groove in the first outer surface, the operation portion is received and slidable in sliding groove, the through hole is positioned in a center of the sliding groove passing through the first inner surface.

5. The electronic device of claim 4, wherein the positioning grooves are positioned on the first inner surface and substantially aligned with the through hole.

6. The electronic device of claim 4, wherein the shell comprises a second part, and the second part and the first part cooperatively forms the receiving space.

7. The electronic device of claim 6, wherein the first part comprises an arched upper lug extending from a side of the first part, the second part comprises an arched lower lug extending from a side of the second part, the upper lug and the lower lug cooperatively constitute a hollow cylinder, the electronic device comprises a hollow cylindrical cover, and the cover sleeves over the upper lug and the lower lug.

8. The electronic device of claim 7, wherein the cover receives a circular transparent glass plate.

9. The electronic device of claim 4, wherein the first part comprises a pair of parallel rail plates, the rail plates are symmetrically distributed at two sides of the though hole and extend from the first inner surface, the driving element comprises a pair of elastic arms extending from two sides of the main portion, and the elastic arms are limited between the rail plates and are attached on the first rail plates.

10. The electronic device of claim 9, wherein each the elastic arm comprises an arched distal end convex away the other elastic arm, and two arched distal ends of the elastic arm are attached on the rail plates.

* * * * *